Patented June 23, 1942

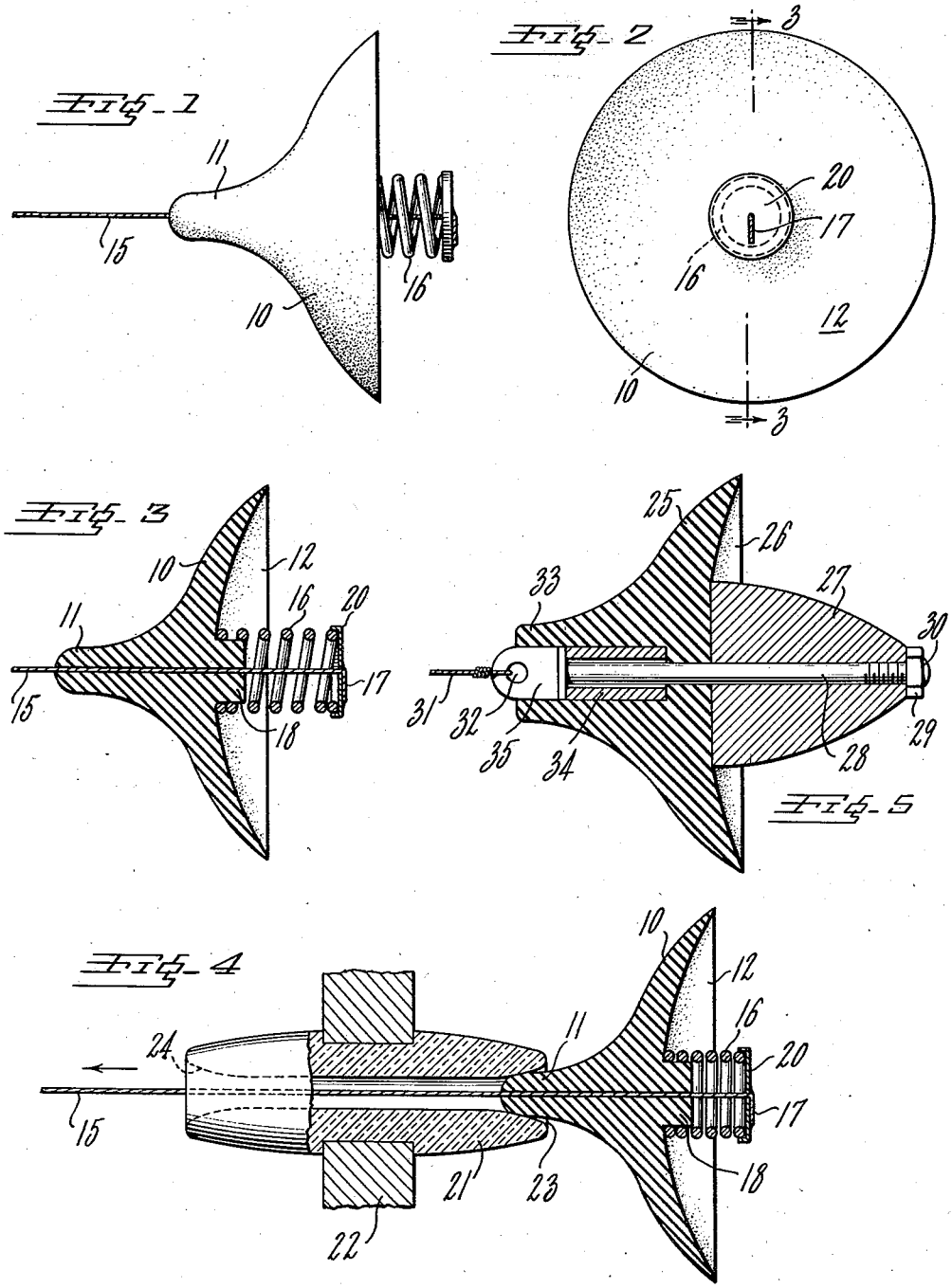

2,287,257

UNITED STATES PATENT OFFICE 2,287,257

ANTENNA DRAG CUP

William P. Lear, Dayton, Ohio, assignor, by mesne assignments, to Lear Avia, Inc., Piqua, Ohio, a corporation of Illinois Application April 5, 1940, Serial No. 327,984

12 Claims. (Cl. 250—33)

This invention relates to antenna systems and more particularly relates to drag-type antennae for aircraft.

In accordance with the present invention, I provide novel drag-type antennae of very light weight, which are self-supporting outside an aircraft in flight. The antenna of the preferred embodiment comprises a light weight wire to the end of which is attached a drag cup behind which a vacuum is created when dragged through the air. A resilient member, such as a spring, attached to the far end of the wire. The drag cup is slidably mounted on the wire and secured to the spring. Adequate support of the antenna wire at speeds above even 50 miles per hour is feasible with my present invention. An important advantage of the invention antenna resides in its absorption of shock and the prevention of strain or breakage of the antenna wire upon full retraction. In a modified form of the invention, a novel weight is incorporated with the drag cup to stably support the antenna wire beneath the aircraft.

It is accordingly an object of my present invention to provide novel drag-type antenna arrangements.

Another object of the invention is to provide a novel light weight, highly efficient drag-type antenna.

Still another object of the invention is to provide a drag-type antenna of simplified construction, embodying shock absorption means for preventing breakage of the wire upon its retraction.

A further object of the present invention is to provide a novel drag-type antenna containing a vacuum cup and a weight for stably supporting the antenna wire beneath the aircraft.

These and further objects and advantages of the present invention will become more apparent in the following description of preferred embodiments thereof, illustrated in the drawing, in which:

Fig. 1 is an elevational view of an antenna drag cup embodiment, in the extended position.

Fig. 2 is a front view of the drag cup assembly at Fig. 1.

Fig. 3 is a vertical cross-sectional view of the drag cup arrangement, taken along the line 3—3 of Fig. 2.

Fig. 4 is a vertical cross-sectional view through the antenna system corresponding to Figs. 1, 2 and 3, in the fully retracted position.

Fig. 5 is a vertical cross-sectional view through a modified drag-type antenna.

A preferred embodiment of the drag-type antenna for over-the-rudder operation, is illustrated in Figs. 1, 2 and 3 in the extended position. Drag cup 10 comprises a spherical body section having a projecting tip 11 and a hollow rear portion 12. The drag cup unit is preferably made of light-weight resilient rubber. Antenna wire 15 projects centrally through the body of cup 10 and tip 11, and is slidable with respect thereto. A spring 16 is attached between end 17 of wire 15 and cup body 10. One end of spring 16 is pressed or force-fitted onto a projecting hub portion 18 integral with rubber body 10, as shown in Fig. 3. An end plate 20 is secured to the free or outside end of spring 16. End 17 of antenna wire 15 is soldered or otherwise attached to end plate 20.

In one construction of the invention, the diameter of the spherical segment 10 was four inches; the internal radius for hollow portion 12, three inches. The outside diameter of spring 16 was three-fourths of an inch, and one and one-half inches long when extended as in Figs. 1 and 3. The cup of resilient India rubber. The weight of the assembly including rubber cup 10, tip 11 and spring 16 was of the order of two ounces. Antenna wire 15 also is as light in weight as is consistent with power strength. In the described construction, antenna wire 15 was one hundred feet of No. 20 B & S gauge, braided bare wire. The wire is preferably of a strong resilient material such as a copper alloy. The total weight of the one hundred feet of antenna wire was four ounces. The total antenna assembly was accordingly six ounces.

The described antenna embodiment exerted a drag or pull of one and one-half pounds in an air speed of one hundred miles per hour. Correspondingly greater drag forces were exerted at higher speeds. The force exerted by compression spring 16 is made sufficient so that it remains substantially in the extended position, as illustrated, for all drag tensions developed in service at the various air speeds encountered. A partial vacuum is created at the rear side of the antenna cup when dragged through the air, specifically behind hollow section 12 thereof. The relatively light weight of the total antenna assembly permits full extension of antenna wire 15 by the drag cup 10 at air speeds as low as fifty miles per hour. The antenna is thus self-supporting above and behind the rudder of the air craft when in motion.

An important feature of the antenna system of the invention resides in the automatic shock absorption thereof upon full wire retraction.

Strain or breakage of antenna wire 15 is thus prevented or greatly minimized, and full retraction of the antenna is feasible without undue concern. Fig. 4 illustrates the antenna system of Figs. 1, 2 and 3 in a fully retracted position against fairlead 21. Fairlead 21 is mounted in and projects through wall 22 of the aircraft. Fairlead 21 is preferably of a ceramic material to minimize radio frequency losses when contacting with antenna wire 15. The inside of front portion 23 of fairlead 21 is flared, to receive projecting tip 11 of the drag cup assembly. The outside of rear portion 24 of fairlead 21 is similarly flared, as indicated, so that no sharp corner is presented to antenna wire 15 moving against it.

When the antenna wire is fully retracted, tip 11 of the antenna cup 10 abuts flared portion 23 of fairlead 21. The resilient nature of tip 11 acts to absorb some of the impact, and also permits gripping thereof by flared fairlead end 23. The antenna cup is accordingly fixed and otherwise gripped into position in fairlead 21 when retracted to the position shown in Fig. 4. Spring 16 is compressed upon the retraction of wire 15 to the position indicated. Breakage of wire 15 is thus greatly minimized by the absorption of impact and shock attendant to abrupt stopping of drag cup 10 by fairlead 21. A "play" of about three-fourths of an inch, corresponding to about half the total spring 16 length, is permitted wire 15 at the end of its retraction movement. Compression spring 16 exerts continuously increased force against the retracting pull on wire 15 as the retraction is completed.

The resilient action by compression spring 16 when in the retracted position, exerts a mechanical biasing force on antenna wire 15 keeping wire 15 taut. The combination of resilient tip 11 gripped in flared fairlead end 23, and the outward biasing action of spring 16, maintains the drag cup assembly and retracted wire 15 in stable position, maintaining the antenna system stable and taut when retracted.

When it is desired to extend the antenna system, the retraction force on antenna wire 15 is released through usual reeling arrangements controlled by the pilot, and not shown herein. Spring 16 is thereupon extended and the drag cup 10 is loosened from fairlead 21. As the speed of the aircraft increases, a vacuum is created behind hollow section 12 of cup 10, dragging the cup away from fairlead 21 and drawing the antenna wire outward behind the aircraft towards its fully extended position. The light weight of the antenna system including the wire 15 and cup 10 facilitates the full extension of the antenna and its maintenance in the extended position at aircraft speeds above even 50 miles per hour.

A modified form of the invention is illustrated in Fig. 5 for drag-type antenna systems to be extended beneath the body of the aircraft. This modification comprises an antenna cup 25, similar to cup 10, comprising a hollow spherical section 26. Cup 25 is preferably though not necessarily made of a resilient rubber material. An egg-shaped weight 27 is secured to cup 25 by eye bolt 28 extending centrally through cup 25 and weight 27. A nut 29 is secured to the end of bolt 28. Tip 30 of bolt 28 is peened over nut 29 as illustrated. The antenna wire 31 is secured to the eye 32 of bolt 28 at a point adjacent extending tip 33 of cup 25. A metal bushing 34 surrounds the section of bolt 28 within cup 25.

The assembly of cup 25 with weight 27 is accomplished by the tightening of nut 29 on the threaded portion of bolt 28 to press the head 35 of the bolt against the internal bushing 34. The juxtaposition of weight 27 against cup 25 at section 26 is along a large area flat section. A suitable material for weight 27 is lead. The tapering arrangement of weight 27, diminishing in diameter as it extends away from cup 25 is designed so as to least interfere with the vacuum drag action by cup 25 and hollow section 26.

As the drag assembly of Fig. 5 is moved through the air, a vacuum is developed behind cup 25 at its hollow section 26. The presence of weight 27, however, carries the drag cup assembly beneath the aircraft through gravity action. The combination of the gravity action by weight 27 and the vacuum drag by cup 25 constitutes a stable force on antenna wire 31 holding it taut beneath the aircraft, during flight conditions. Upon retraction, rubber tip 33 abuts a corresponding opening in the fairlead to absorb some shock of the impact when fully retracted. By substituting a compression spring for metal bushing 34, a further shock absorbing action is provided for the system of Fig. 5, corresponding to the action of spring 16 of the previously described embodiment.

Although I have described preferred embodiments for carrying out the principles of my present invention, it is to be understood that modifications may be made therein by those skilled in the art without departing from the spirit and scope of the invention as expressed in the appended claims.

What I claim is:

1. A drag-unit for a trailing antenna comprising a cup having a hollow section, a member extending through said cup in slidable relation therewith, and resilient means operably attaching one end of said member to said cup in a manner permitting said cup to be slidable on said member.

2. A drag-unit for a trailing antenna comprising a spherical cup section of resilient material, a wire extending centrally through said cup section in slidable relation therewith, and a spring with one end fastened to said cup section and the other end secured to said wire, whereby said cup section is slidable on said wire.

3. A drag-unit for a trailing antenna comprising a cup having a hollow section and a tip extending away from said section and coaxially therewith, a member extending centrally through said cup and tip thereof in slidable relation therewith, and a spring with one end fastened to said cup and the other end secured to said member, whereby said cup is slidable on said member.

4. A drag-unit for a trailing antenna comprising a resilient cup having a hollow section with a central projecting hub, and a tip extending away from said section and coaxially therewith, a wire extending centrally through said cup and tip thereof in slidable relation therewith, and resilient means operably attaching one end of said wire to said cup including a spring with one end gripped onto said hub and the other end secured to said wire, whereby said cup is slidable on said wire.

5. A drag-type antenna system comprising a cup having a hollow section, an antenna wire having an end portion extending through said cup in slidable relation therewith, and resilient means operably attaching the wire end to said cup in a manner permitting said cup to be slidable on the wire.

6. A drag-type antenna system comprising a resilient cup having a hollow section and a tip extending from said cup away from said section, an antenna wire having an end portion extending centrally through said cup and tip thereof in slidable relation therewith, and resilient means operably attaching the wire end to said cup in a manner permitting said cup to be slidable on the wire.

7. A drag-type antenna system comprising a resilient rubber cup having a hollow spherical section and a tip extending from said cup away from said section and coaxially therewith, said cup being of the order of two ounces in weight and four inches in diameter, an antenna wire having an end portion extending centrally through said cup and tip thereof in slidable relation therewith, and resilient means operably attaching the wire end to said cup.

8. A drag-type antenna system comprising a cup having a hollow section, an antenna wire having an end portion extending through said cup in slidable relation therewith, a spring operably attaching the wire end to said cup, one end of said spring being gripped to said cup adjacent said section and said wire end being secured with the other spring end, whereby said cup is slidable on the wire.

9. A drag-type antenna system comprising a resilient cup having a hollow section with a hub and a tip extending from said cup away from said section and coaxially therewith, an antenna wire having an end portion extending centrally through said cup and tip thereof in slidable relation therewith, resilient means operably attaching the wire end to said cup including a spring with one end gripped onto said hub, an end plate on the other end of said spring, said wire end being secured to said end plate.

10. A drag-type antenna system comprising a resilient rubber cup having a hollow spherical section with a central hub projecting into said section and a tip extending from said cup away from said section and coaxially therewith, an antenna wire having an end portion extending centrally through said cup and tip thereof in slidable relation therewith, resilient means operably attaching the wire end to said cup including a compression spring with one end gripped onto said central hub, said wire end being secured with the other spring end, said spring extending substantially from said cup when the antenna is in the extended position, whereby said spring absorbs retraction shocks of the antenna wire.

11. A drag-type antenna system comprising a resilient rubber cup having a hollow spherical section and a tip extending from said cup away from said section and coaxially therewith, said cup being of the order of two ounces in weight and four inches in diameter, a trailing antenna wire of the order of four ounces in weight having an end portion extending centrally through said cup and tip thereof in slidable relation therewith, resilient means operably attaching the wire end to said cup including a compression spring with one end gripped onto said cup adjacent said section, an end plate on the other end of said spring, said wire end being secured to said end plate, said spring extending of the order of one and one-half inches from said cup when the antenna is in the extended position, whereby said extending tip and said spring absorb shocks of retraction of the wire.

12. A drag-type antenna system comprising a resilient rubber cup having a hollow spherical section, a resilient tip extending substantially from said cup in a direction away from said section and coaxially therewith, said cup being of the order of two ounces in weight and four inches in diameter, a trailing antenna wire of the order of four ounces in weight having an end portion extending centrally into said tip, and means for attaching the wire end to said cup.

WILLIAM P. LEAR.